United States Patent [19]
Fritz

[11] Patent Number: 6,098,007
[45] Date of Patent: Aug. 1, 2000

[54] CONTROL ARRANGEMENT FOR LONGITUDINAL DYNAMICS OF A MOTOR VEHICLE

[75] Inventor: Hans Fritz, Ebersbach, Germany

[73] Assignee: DaimlerChrysler AG, Stuttgart, Germany

[21] Appl. No.: 08/908,038

[22] Filed: Aug. 11, 1997

[30] Foreign Application Priority Data

Aug. 10, 1996 [JP] Japan .................... 196 32 337

[51] Int. Cl.$^7$ .................... G06F 17/00
[52] U.S. Cl. .................... 701/93; 701/70
[58] Field of Search .................... 701/1, 36, 48, 701/51, 53, 54, 58, 65, 70, 93, 94, 110; 123/349, 350, 361; 477/97, 107, 110, 183, 186, 187

[56] References Cited

U.S. PATENT DOCUMENTS

| | | |
|---|---|---|
| 4,674,029 | 6/1987 | Maudal . |
| 4,928,484 | 5/1990 | Peczkowski . |
| 5,184,527 | 2/1993 | Nakamura .................... 477/110 |
| 5,532,929 | 7/1996 | Hattori et al. .................... 701/110 |

FOREIGN PATENT DOCUMENTS

| | | |
|---|---|---|
| 0441961 A1 | 12/1988 | European Pat. Off. . |
| 34 16 812 A1 | 11/1985 | Germany . |
| 36 05 117 A1 | 8/1986 | Germany . |
| 43 27 654 A1 | 2/1994 | Germany . |
| 43 38 399 A1 | 5/1995 | Germany . |
| 44 25 957 C1 | 3/1996 | Germany . |
| 195 15 046 A1 | 6/1996 | Germany . |
| 2-34438 | 2/1990 | Japan . |
| 4-203251 | 7/1992 | Japan . |
| 6-242836 | 9/1994 | Japan . |
| 07304350A | 2/1995 | Japan . |
| 2 294 337 | 4/1996 | United Kingdom . |

OTHER PUBLICATIONS

Application of Self–Tuning To Automotive Cruise Control (Proceedings of the 1990 American Control Conference—1990) M. Tsujii, . Takeuchi, K. Oda and M. Ohba; Research & Development Dept., Nippondenso Co., Ltd. pp. 1843–1848.

*Primary Examiner*—William A. Cuchlinski, Jr.
*Assistant Examiner*—Edward Pipala
*Attorney, Agent, or Firm*—Evenson, McKeown, Edwards & Lenahan, P.L.L.C.

[57] ABSTRACT

The invention provides a method and apparatus for controlling the longitudinal dynamics of a motor vehicle, in which, as control output signal, at least one drive train actuating signal is generated as a function of input data comprising the current driving state of the vehicle, and the desired longitudinal speed or the desired longitudinal acceleration.

Using these input data, controller-internal values for the desired longitudinal speed and the desired longitudinal acceleration are determined, and the drive train actuating signal is ascertained therefrom using an inverse vehicle longitudinal dynamics model to take into account the non-linear dynamics of vehicle behaviour, which is particularly relevant in the low driving speed range.

9 Claims, 3 Drawing Sheets

CONTROL ARRANGEMENT FOR LONGITUDINAL DYNAMICS OF A MOTOR VEHICLE

BACKGROUND AND SUMMARY OF THE INVENTION

The invention relates to a method and apparatus for controlling the longitudinal dynamics (speed and acceleration) of a motor vehicle.

In conventional-longitudinal dynamics control systems in the form of so-called tempomat systems, a predefinable driving speed is adjusted by means of a speed controller which generates an actuating signal as a function of the respective control deviation, and transmits it to an actuating element in the drive train (for example, a throttle flap) in order to adjust the control deviation to zero. A more sophisticated control system is described in German patent document DE 43 38 399 A1. In order to improve maintenance of the desired speed when driving downhill, the vehicle braking power is influenced via an associated control unit.

As is known, the control characteristics of such conventional vehicle longitudinal dynamics control systems become less and less satisfactory at lower driving speeds because of the increasing significance of the non-linear behaviour of the vehicle. This is important, for example, in distance control systems having a hierarchical structure, in which a longitudinal dynamics control loop is subordinate to a distance control loop. A distance control system which is described in German patent document 195 23 111.2 (not a prior publication) remedies this problem by providing a distance controller which contains an artificial neural network that is trained using a non-linear vehicle longitudinal dynamics model which is based on a characteristic map.

Furthermore, methods and apparatus for controlling the vehicle longitudinal dynamics which use non-linear vehicle longitudinal dynamics models (in the form of so-called observer concepts) are already known. A system of this type is described in German patent document DE 36 05 117 A1. In that document, the observer is used to generate optimum controller coefficients which are used to multiply integrated control differences of the control variables longitudinal speed and engine air quantity. The latter are used to generate change contributions on the basis of which, in a following reference setpoint addition component, the actuating signals for a throttle flap and a fuel injection device are generated.

One object of the present invention is to provide a method and apparatus of the generic type mentioned above for vehicle longitudinal dynamics control, which reliably controls driving speed with satisfactory control accuracy at both high and very low desired speeds, and/or driving acceleration at both low and very high driving speeds.

This and other objects and advantages are achieved by the control method and apparatus according to the invention in which controller-internal desired speed and desired acceleration values are first ascertained from data predefined on the input side (for example by the driver, or by a higher-order distance control loop) and data about the current driving state. An actuating signal for the drive train of the vehicle is then determined from the controller-internal values using an inverse vehicle longitudinal dynamics model. The current driving state in this case contains information about at least the instantaneous driving speed, (that is, current longitudinal speed), the engine speed and/or the transmission ratio; preferably, it also contains information about the current longitudinal acceleration and the instantaneous highway slope.

The inverse vehicle longitudinal dynamics model contains models of those vehicle components which are relevant to the longitudinal dynamics, such as the engine, the (generally automatic) transmission, the rear axle and the braking system. By "inverting" the vehicle longitudinal dynamics model, input-side actuating signals for the drive train and (if appropriate) the braking system can be used to ascertain the associated instantaneous values for longitudinal speed and acceleration. Such a non-linear vehicle longitudinal dynamics model is disclosed, for example, in the abovementioned German Patent document 195 23 111.2 (not a prior publication).

In this manner, reliable control of the longitudinal speed or of the longitudinal acceleration may be realized in both the high and low driving speed ranges. When this method and apparatus are used as a subordinate part of a distance control system, the latter is simplified and improved, since the subordinate control loop comprehends the non-linear vehicle behaviour. Thus, a linear vehicle behaviour; even in the low speed range, may be assumed for the design of the higher-order distance controller.

In one embodiment of the invention the inverse vehicle longitudinal dynamics model is designed to achieve high control accuracy of the longitudinal dynamics control for a motor vehicle having an automatic transmission which has a conventional torque converter and discrete step transmission.

In another embodiment of the invention, the braking system is also included in the longitudinal dynamics control.

In other embodiments of the invention, the longitudinal dynamics control device contains, as longitudinal dynamics controller, either a speed controller or an acceleration controller having a control rule which is in each case suitably implemented in the first stage.

Other objects, advantages and novel features of the present invention will become apparent from the following detailed description of the invention when considered in conjunction with the accompanying drawings.

DETAILED DESCRIPTION OF THE DRAWINGS

Figure 1:
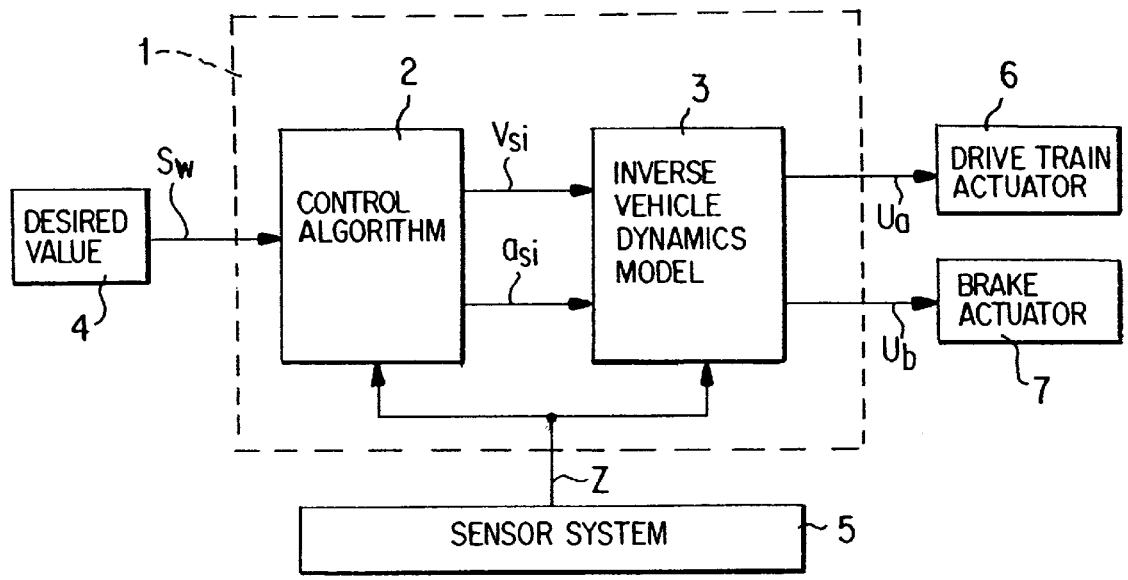
FIG. 1 is a schematic block diagram of a device for controlling the longitudinal dynamics of a motor vehicle having a two-stage controller containing an inverse vehicle longitudinal dynamics model according to the invention.

The device illustrated in FIG. 1 for controlling the longitudinal dynamics of a motor vehicle contains a longitudinal dynamics controller (1), which is indicated in a dashed frame and is designed either as a speed controller or as an acceleration controller. It should be noted, of course, that the controller (1) may, if appropriate, be designed as a changeover controller so that it operates in a changeover fashion as speed controller in a first operating mode and as acceleration controller in a second operating mode.

The controller (1) is constructed with two stages, a suitable control algorithm being implemented in a first stage (2) and an inverse vehicle longitudinal dynamics model being implemented in a second stage (3) connected downstream. Connected upstream of the controller (1) is a desired. value input unit (4), which forwards to the controller (1) a longitudinal dynamics desired value ($S_w$) predefined by the driver or by a higher-order distance control loop.

If the controller (1) is designed as a speed controller, this desired value is a longitudinal speed; if the controller is designed as an acceleration controller, this value is a longitudinal acceleration. This predefined longitudinal dynamics desired value ($S_w$) can, of course, be predefined such that it can be varied over time.

Both controller stages (2, 3) are supplied, by an appropriate sensor system (5), with information (Z) about the instantaneous vehicle operating (driving) state. This information includes at least one of the variables current driving speed, engine speed and transmission ratio of an automatic transmission present in the vehicle, as well as preferably the variables current longitudinal acceleration and current highway slope. Based on the input variables supplied, the first controller stage (2), containing the control algorithm, delivers a controller-internal desired driving speed ($v_{si}$) and a controller-internal desired longitudinal acceleration ($a_{si}$), which are supplied to the following controller stage (3) containing the inverse vehicle longitudinal dynamics model. Taking into account the driving state information (Z) supplied to it by the sensor system (5), as well as the values received from the first controller stage (2), the second controller stage (3) determines on the one hand a drive train actuating signal ($U_a$), which is supplied to a drive train actuating element (6), and on the other hand a braking system actuating signal ($U_b$), which is supplied to a braking system actuating element (7).

In the speed controller mode, the first controller stage (2) can implement a control algorithm in which the controller-internal desired driving speed ($V_{si}$) corresponds to an externally supplied desired driving speed ($S_w=v_{sp}$), and the controller-internal desired longitudinal acceleration ($a_{si}$) is given as the quotient of the speed control deviation ($v_{diff}$), (the difference between the desired longitudinal speed ($v_{sp}$) and the current longitudinal speed ($v_{act}$)), divided by a predefinable control parameter ($T_v$). In alternative, particularly advantageous embodiment, the controller-internal desired driving speed ($v_{si}$) is defined as the sum of the externally predefinable desired longitudinal speed ($v_{sp}$) and an additive term which is composed of the sum of the proportional, integral and differential (PID) terms of the speed control deviation ($v_{diff}$). That is, $$v_{si}=v_{sp}+Kp_v \cdot v_{diff}+Ki_v \cdot \Sigma(v_{diff})+Kd_v \cdot d(v_{diff})/dt$$

where $Kp_v$, $Ki_v$ and $Kd_v$ are controller parameters to be defined as a function of the vehicle type and of the requirements placed on the control loop.

When the longitudinal dynamics controller (1) functions as an acceleration controller, the first controller stage (2) can implement a control algorithm in which the controller-internal desired longitudinal acceleration ($a_{si}$) corresponds to the externally predefined desired longitudinal acceleration ($S_w=a_{sp}$), and the controller-internal desired longitudinal speed ($v_{si}$) is given as the sum of the current longitudinal speed ($v_{act}$) and the product of the externally supplied desired longitudinal acceleration ($a_{sp}$) and an appropriately predefinable controller parameter ($T_a$). In alternative, particularly advantageous embodiment, the acceleration control mode includes a control algorithm in which a longitudinal acceleration control difference ($a_{diff}$) (the difference between the externally predefinable desired longitudinal acceleration ($a_{sp}$) and current longitudinal acceleration ($a_{act}$)) is formed, and the controller-internal desired longitudinal acceleration ($a_{si}$) is then formed as the sum of externally predefined desired longitudinal acceleration ($a_{sp}$) with the PID terms of the longitudinal acceleration control deviation ($a_{diff}$) The controller-internal desired longitudinal speed ($v_{si}$) can then be determined by integrating the controller-internal desired longitudinal acceleration ($a_{si}$). That is:

$$a_{si}=a_{sp}+Kp_a \cdot a_{diff}+Ki_a \cdot \Sigma(a_{diff})+Kd_a \cdot d(a_{diff})/dt, \; v_{si}=v_{si}+T_a \cdot a_{si}$$

where, $T_a$, $Kp_a$, $Ki_a$ and $Kd_a$ are, once more, controller parameters which are to be set appropriately.

Figure 2:
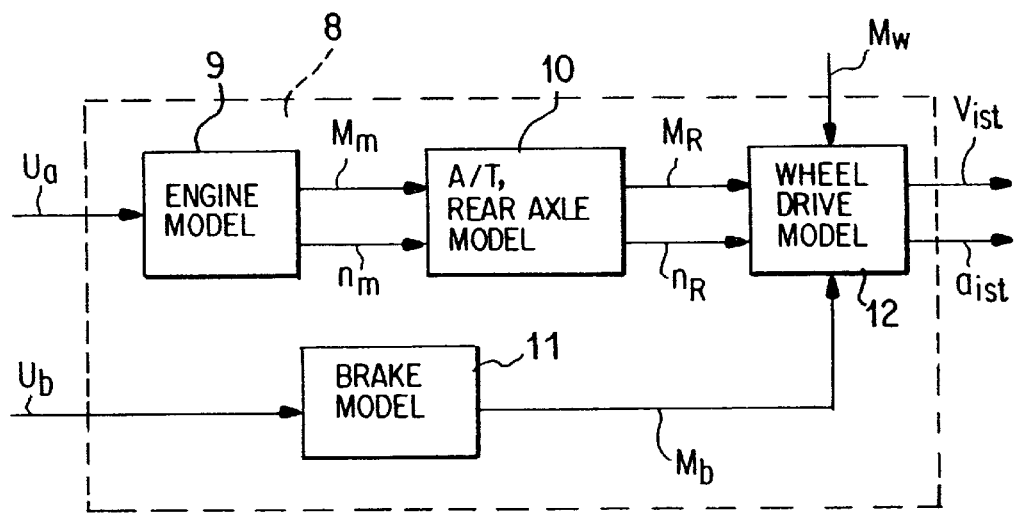
FIG. 2 is a schematic block diagram of the vehicle longitudinal dynamics model on which the controller of FIG. 1 is based.
Figure 3:
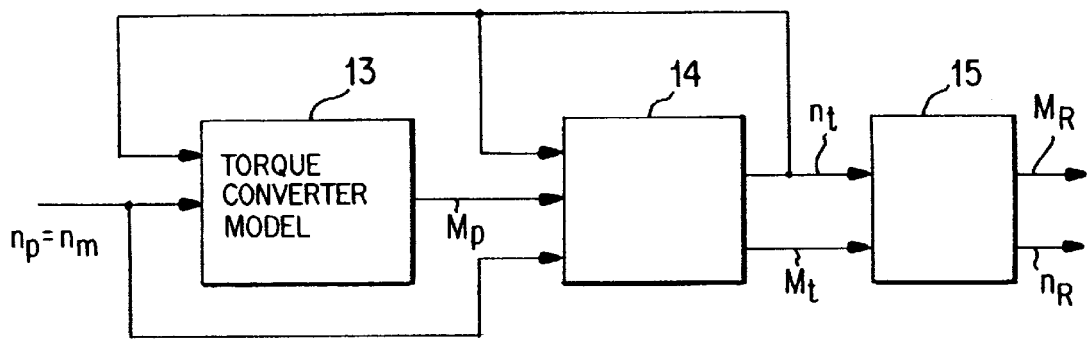
FIG. 3 is a schematic block diagram of that part of the vehicle longitudinal dynamics model of FIG. 2 which relates to an automatic transmission having a torque converter and driven rear axle.

The inverse vehicle longitudinal dynamics model implemented in the second controller stage (3) is based on a vehicle longitudinal:dynamics model whose essential components are illustrated in FIGS. 2 and 3. The drive train actuating signal ($U_a$) and the braking system actuating signal ($U_b$) are used as input variables of the longitudinal dynamics model unit (8) (shown in a dashed frame in FIG. 2), which contains the underlying vehicle longitudinal dynamics model. The drive train actuating signal ($U_a$) is supplied to an input of an engine model unit (9), which determines therefrom the engine output torque ($M_m$) and engine speed ($n_m$), which are provided as input variables for an automatic transmission and rear axle model unit (10) connected downstream. The latter unit ascertains therefrom a wheel driving torque ($M_R$) to be applied to the driving wheels and the associated wheel speed ($n_R$). In parallel with this, a braking system model unit (11) determines, from the braking system actuating signal ($U_b$) supplied, an associated braking torque ($M_b$). From the braking torque ($M_b$), the wheel driving torque ($M_R$) and the wheel speed ($n_R$), a wheel drive model unit (12) ascertains the driving state variables longitudinal speed (vact) and longitudinal acceleration ($a_{act}$), taking into account the external driving resistance torque ($M_w$), which comprises air resistance forces, slope forces and rolling resistance forces.

The components for modelling of the automatic transmission, comprising a torque converter and a discrete step gearbox, and of the rear axle are illustrated in more detail in FIG. 3. The modelling of the torque converter is performed via two components (13, 14) which are connected in sequence on the input side, the torque converter being assumed to be a hydrodynamics coupling in which the torques are transmitted between pump wheel and turbine wheel by a fluid. The modelling of the processes in the torque converter is performed essentially with the aid of two non-linear characteristic curves in order to determine the torque ($M_p$) received by the pump, on the one hand, and the torque ($M_t$) output by the turbine on the other hand. The ratio ($n_v$) of the turbine speed ($n_t$) divided by the pump speed ($n_p$) is needed for this. Since the pump is connected directly to the engine, its speed ($n_p$) corresponds to the engine speed ($n_m$).

The converter model component (13) on the input side contains the converter characteristic curve for the torque ($M_p$) received by the pump, as a function of the turbine/pump speed ratio ($n_v$) and the square of the engine speed ($n_m$). The converter model component (14) connected downstream contains the converter characteristic curve for the ratio ($\mu=M_t/M_p$) of turbine torque ($M_t$) and pump torque ($M_p$) as a function of the turbine/pump speed ratio ($n_v$). In order to accomplish this, the turbine speed information ($n_t$) is fed back on the input side to the two converter model units (13, 14), and the engine speed information ($n_m$) is supplied in parallel to these two units (13, 14). An output-side model component (15) which is connected downstream determines the overall ratio ($i_{ov}$) from discrete gearbox ratio ($i_g$) and rear axle transmission ratio ($i_d$) and, from this, determines the wheel driving torque ($M_R$) (by means of the turbine torque information ($M_t$) supplied) and the wheel speed ($n_R$) (by means of the turbine speed information ($m_t$) supplied).

The realization of the longitudinal dynamics control device of FIG. 1 and of the control method carried out by the latter is based, then, on an inversion of the functions described in relation to FIGS. 2 and 3. That is, the controller-internal desired values ($v_{si}$, $a_{si}$) for the longitudinal speed and the longitudinal acceleration are determined from a predefined desired value ($S_w$) (optionally the desired longitudinal speed ($v_{sp}$) or the desired longitudinal acceleration ($a_{sp}$)) via an appropriate control algorithm. From the controller-internal desired values ($v_{si}$, $a_{si}$) the actuating signals ($U_a$, $U_b$) for the actuating elements (6, 7) of the drive train and of the braking system are then formed with the aid of the inverse vehicle longitudinal dynamics model.

Figure 4:
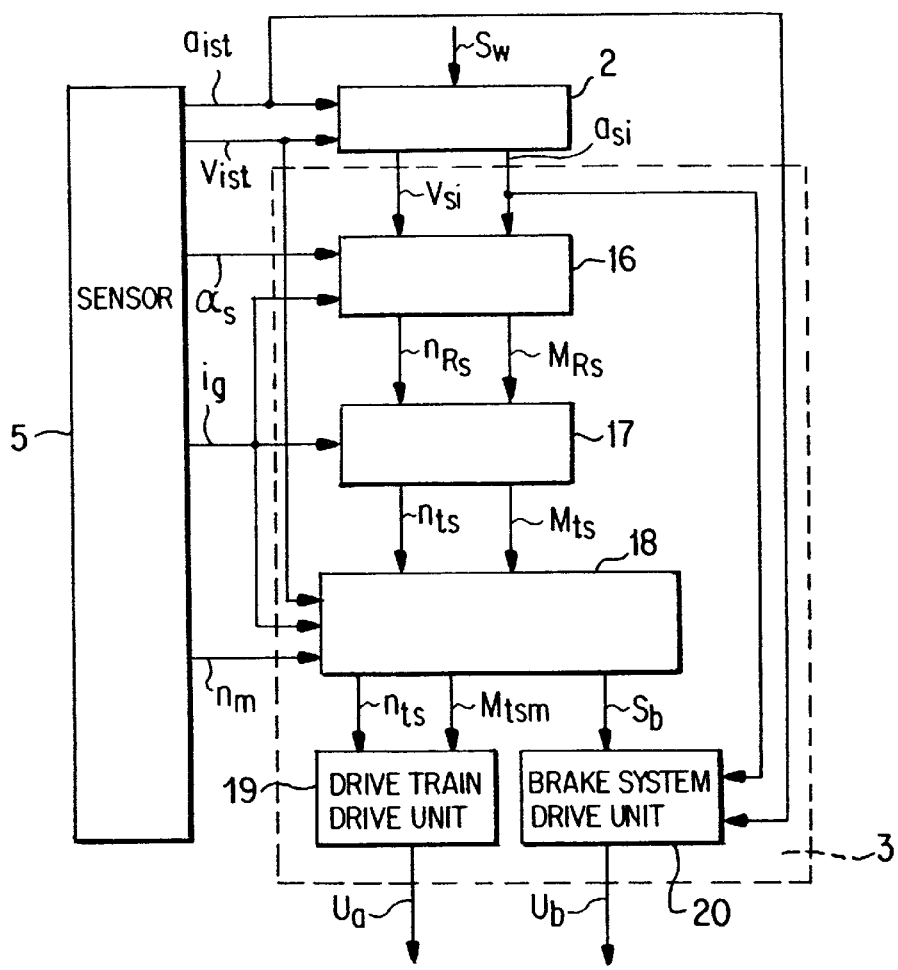
FIG. 4 is a schematic, more detailed block diagram of the second stage of the controller of the device of FIG. 1.

That part of the device of FIG. 1 which is related to the inverse vehicle longitudinal dynamics model (second controller stage (3)) is illustrated in more detail in. FIG. 4. The second controller stage (3) contains, on the input side, a unit (16) for determining a desired wheel driving torque ($M_{Rs}$) and a desired wheel speed ($n_{Rs}$), a unit (17), connected downstream of the first unit, for determining a desired turbine torque ($M_{ts}$) and a desired turbine speed ($n_{ts}$) for the torque converter of the automatic transmission, a unit (18), connected downstream of the second unit for ascertaining drive/overrun changeover, which determines a modified desired turbine torque ($M_{tsm}$) and a binary braking system control signal ($S_w$), and, connected downstream of the third unit, in parallel with each other, a drive train drive unit (19) and a braking system drive unit (20). The drive train drive unit (19) determines the drive train actuating signal ($U_a$) as a function of the modified desired turbine torque ($M_{tsm}$) and of the desired turbine speed ($n_{ts}$), while the braking system drive unit (20) generates the braking system actuating signal ($U_b$) as a function of the binary control signal ($S_b$), as well as the current longitudinal acceleration ($a_{act}$) and the desired longitudinal acceleration ($a_{si}$) ascertained within the controller.

Based on the input variables current driving speed ($v_{ist}$), transmission ratio ($i_g$) and highway slope ($\alpha_s$), which are supplied directly by the sensor system (5) or via the first controller stage (2) connected upstream, the input-side unit (16) of the second controller stage (3), ascertains values belonging to the controller-internal desired driving speed ($v_{si}$) and desired longitudinal acceleration ($a_{si}$) for the desired wheel driving torque ($M_{Rs}$) and the desired wheel speed ($n_{Rs}$) in accordance with the following relationships:

$$M_{FWS}=R \cdot [(f_{roll} \cos (\alpha_s) + \sin (\alpha_s)) \cdot m \cdot g + f_1 v_{si} \cdot v_{si}]$$

$$M_{BS}=R \cdot m \cdot a_{si} + (J_v + J_h) \cdot a_{si}/R$$

$$M_{RS}=M_{FWS}+M_{BS}$$

$$n_{RS}=v_{si}/2 \cdot \pi \cdot R,$$

where R is the wheel radius, $f_{roll}$ is the coefficient of rolling resistance, $f_1$ is the coefficient of air resistance, m is the vehicle mass, g is the acceleration due to the earth's gravity, $J_v$ is the moment of inertia of the front wheels and $J_h$ is the moment of inertia of all the transmission parts relating to the rear axle. In this case, use is made of the known fact, described for example in M. Mitschke's book: Dynamik der Kraftfahrzeuge, Band A, Antrieb und Bremsung [Motor Vehicle Dynamics, Volume A, Drive and Braking], Springer-Verlag (1988), that the wheel driving torque ($M_R$) can be determined as the sum of driving resistance torque ($M_{FW}$) and acceleration resistance torque ($M_B$)

The downstream unit (17) is supplied with the ascertained values for the desired wheel driving torque ($M_{Rs}$) and the desired wheel speed ($n_{Rs}$) from the input-side unit (16) as well as the instantaneous transmission ratio ($i_g$), which is received from the sensor system (5) Together with the constant rear-axle ratio ($i_d$), this unit (17) then determines the desired turbine torque ($M_{ts}$) and the desired turbine speed ($n_{ts}$) of the torque converter of the automatic transmission in accordance with the relationships:

$$M_{ts}=m_{Rs}/(i_g \cdot i_d)$$

$$n_{ts}=n_{Rs} \cdot i_g \cdot i_d.$$

Figure 5:
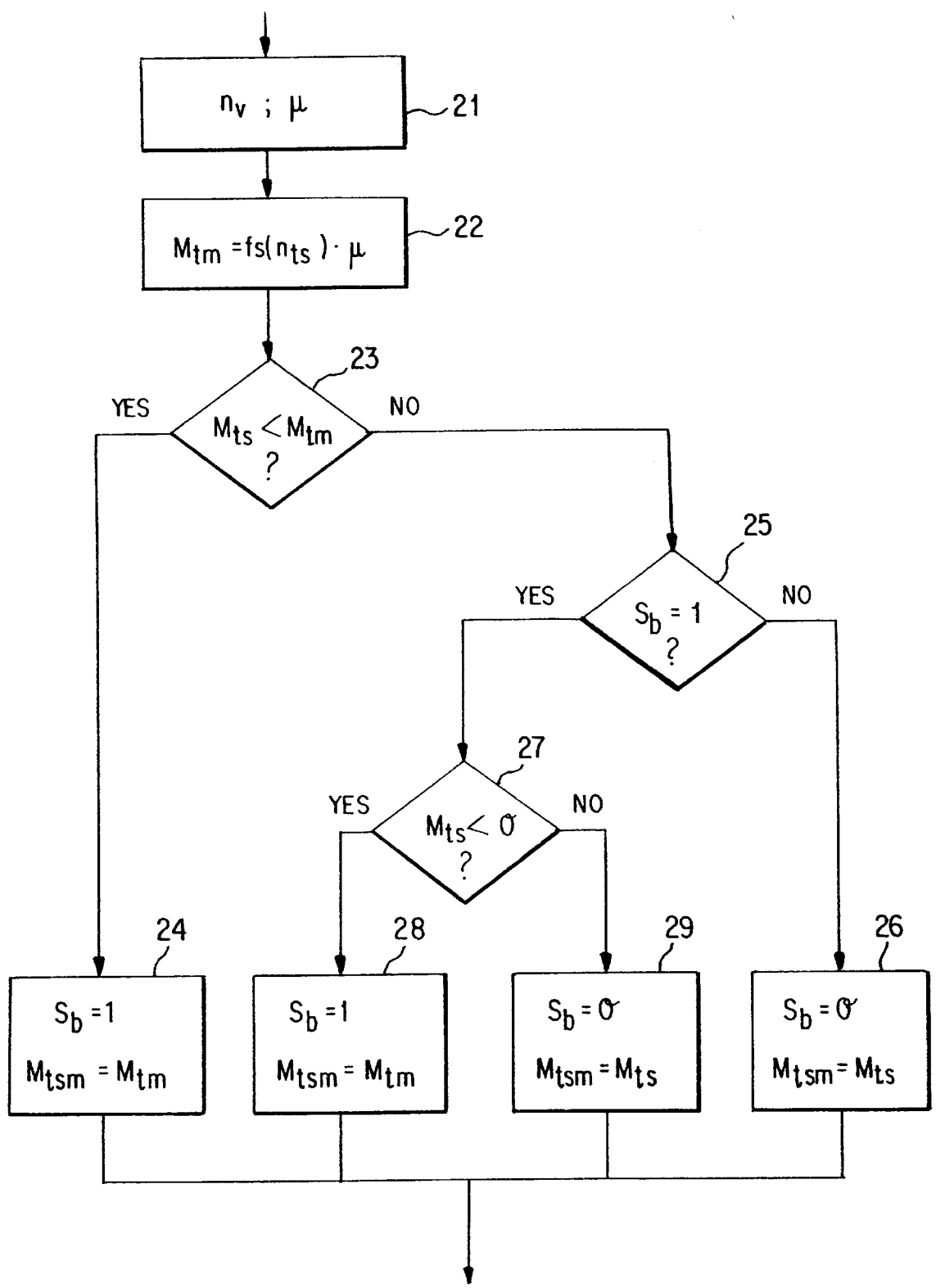
FIG. 5 is a flow diagram which illustrates the ascertainment of a drive/overrun changeover realized in the second stage of the longitudinal dynamics controller of FIG. 1.

The values for the desired turbine torque ($M_{ts}$) and the desired turbine speed ($n_{ts}$) are supplied to the downstream unit (18), which also receivesss from the sensor system (5) the instantaneous driving speed ($v_{act}$), the instantaneous transmission ratio ($i_g$) and the instantaneous engine speed ($n_m$). This unit (18) of the second controller stage (3) prevents the simultaneous opening of the throttle and braking. For this purpose, it-proceeds in accordance with a method sequence shown in more detail in FIG. 5.

In a first step (21), the unit (18) first determines the current speed ratio ($n_v$) from the supplied signals of the current longitudinal speed ($v_{act}$), the transmission ratio ($i_g$) and the engine speed ($n_m$). Then, using the appropriate torque converter characteristic curve, it determines the instantaneous ratio ($\mu$) of turbine torque ($M_t$) to pump torque ($M_p$). Next, in step (22), the engine overrun torque ($f_s$) corresponding to the desired turbine speed ($n_{ts}$) is multiplied by the torque ratio ($\mu$), to determine the minimum turbine torque ($M_{tm}$) which can be realized on the turbine side of the torque converter by the engine in overrun operation. In a following interrogation step (23), the unit checks whether the necessary desired turbine torque ($M_{ts}$) is less than this minimum turbine torque ($M_{tm}$) which can be realized by the engine via the converter. If so, the overrun torque of the engine (acting via the torque converter of the automatic transmission) is, not sufficient for the desired vehicle retardation, and in a next step (24), the binary control signal ($S_b$) is set to the value one and hence the braking system drive unit (20) is informed that a braking operation is to be activated. At the same time, the modified desired turbine torque ($M_{tsm}$) receives the value of the calculated minimum turbine torque is ($M_{tm}$).

If the answer to the above mentioned turbine torque interrogation step (23) is no, then, using the value of the binary control signal ($S_b$) it is determined in a subsequent interrogation step (25), whether a braking operation is already active. If not, then the braking system remains deactivated (that is, the binary control signal ($S_b$) remains at zero), and the desired turbine torque ($M_{ts}$) is forwarded in an unaltered state as the modified desired turbine torque ($M_{tsm}$) (step 26). If, on the other hand, the above mentioned interrogation produces a positive reply, a check is made, in a following interrogation step (27), whether the necessary desired turbine torque ($M_{ts}$) is negative. If so, the binary control signal ($S_b$) remains at the value one (and hence the braking system continues to remain active), and the modified desired turbine torque ($M_{tsm}$) is, in turn, set to the value of the calculated minimum turbine torque ($M_{tm}$) (step 28). In the other case, the binary control signal ($S_b$) is set to zero so that the braking system is deactivated, and the desired turbine torque ($M_{ts}$) is forwarded in an unaltered state as the modified desired turbine torque ($M_{tsm}$) (step 29).

As can be seen from FIG. 4, for the respectively. appropriate activation or deactivation of the braking system, the braking system drive unit (20) generates the braking system actuating signal ($U_b$) as a function of the value of the binary control signal ($S_b$), of the controller-internal desired longitudinal acceleration ($a_{si}$) and of the current longitudinal acceleration ($a_{act}$) supplied via the sensor system (5). The unit (18) for ascertaining drive/overrun operation also supplies the modified desired turbine torque ($M_{tsm}$) and the desired turbine speed ($n_{ts}$) to the unit (19), which generates the drive train actuating signal ($U_a$). From these values, this unit (19) ascertains a desired engine torque ($M_{ms}$) and a desired engine speed ($n_{ms}$). However, the two above mentioned torque converter characteristic curves cannot be used directly, since they require, as input variables, the desired speed ratio and the desired engine speed ($n_{ms}$) which is actually still to be determined. This difficulty is overcome by forming a new characteristic curve from the two converter characteristic curves. The said new characteristic curve depends only on the speed ratio ($\mu_{sp}=n_{ts}/n_{ms}$) rather than on the sought-after desired engine speed ($n_{ms}$). By setting the pump torques from the two original characteristic curves equal, one obtains the new characteristic curve, which describes an invertible function. With the aid of this new characterisctic curve, the desired speed ratio ($\mu_{sp}$) (and hence the sought-after desired engine speed ($n_{ms}$)) can be determined from the known, modified desired turbine torque ($M_{tsm}$) and the desired turbine speed ($n_{ts}$). The sought-after desired engine torque ($M_{ms}$) may be ascertained from the modified desired turbine torque ($M_{tsm}$) via the original second converter characteristic curve ($\mu$). Starting from at least one of the variables desired engine torque ($M_{ms}$) and desired engine speed ($n_{ms}$), the unit (19) of the second controller stage (3) then determines the drive train actuating signal ($U_a$). Depending on the type of engine and actuating element which are present in the vehicle, this actuating signal ($U_a$) may be, for example, the desired engine torque ($M_{ms}$) itself, a desired throttle flap setting or an amount of fuel to be injected.

Overall, the above description of an exemplary embodiment according to the invention and of a possible modification thereof provide a method and apparatus for, controlling vehicle longitudinal dynamics which already take into account within the control system the non-linear dynamics motor-vehicle behaviour which is relevant in particular in the low driving speed range, and hence also provide beneficial control characteristics precisely in the low driving speed range.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Method of controlling longitudinal dynamics of a motor vehicle as a function of input data comprising current vehicle driving state parameters and one of a desired longitudinal speed ($v_{sp}$) and a desired longitudinal acceleration, ($a_{sp}$), said method comprising:

determining controller-internal values for the desired longitudinal speed ($v_{si}$) and the desired longitudinal acceleration ($a_{si}$) as a function of said input data; and generating at least a drive train actuating signal ($U_a$) as a function of at least said controller-internal values, by means of an inverse vehicle longitudinal dynamics model, which generates corresponding actuating signal values in response to an input of said desired longitudinal speed value and said desired longitudinal acceleration value, based on an inversion of a model which simulates dynamic response of the vehicle to input actuating signal values.

2. The method according to claim 1, wherein:

said vehicle has an automatic transmission;

said drive train actuating signal comprises a drive train actuating signal ($U_a$) and a braking system actuating signal ($U_b$), and said generating step comprises at least one of determining a driving resistance torque ($M_{Fws}$), an acceleration torque ($M_{Bs}$), a necessary desired wheel driving torque ($M_{R3}$) and a desired wheel speed ($n_{Rs}$) as a function of at least one of said controller internal values, a vehicle transmission ratio ($i_g$) and a highway slope ($\alpha_s$);

determining a desired turbine torque ($M_{ts}$) and a desired turbine speed ($n_{ts}$) for an automatic transmission torque converter as a function of the transmission ratio ($i_g$), the desired wheel driving torque ($M_{Rs}$) and the desired wheel speed ($n_{Rs}$)

accessing a characteristic map to determine an instantaneous torque ratio ($\mu$) between turbine torque ($M_t$) and engine torque ($M_m$) as a function of a ratio between turbine speed ($n_t$) and engine speed ($n_m$);

accessing a characteristic map to determine an engine overrun torque ($M_m$) in overrun operation as a function of the engine speed ($n_m$);

determining a minimum turbine torque ($M_{tm}$) which can be realized at a turbine side of said torque converter by the engine in overrun operation by multiplying said instantaneous torque ratio ($\mu$) by the engine overrun torque, the engine speed ($n_m$) for determining the engine overrun torque being set equal to the desired turbine speed ($n_{ts}$);

using a characteristic curve to determine a desired engine torque ($M_{ms}$) and a desired engine speed ($n_{ms}$) as a function of at least desired turbine torque ($M_{ts}$) and desired turbine speed ($n_{ts}$); and generating the drive train actuating signal ($U_a$) as a function of at least one of the variables desired engine torque ($M_{ms}$) and desired engine speed ($n_{ms}$).

3. The method according to claim 2 further comprising the step of:

determining a modified desired turbine torque ($M_{tsm}$) and a binary braking system control signal ($S_b$), as a function of a comparison between the desired turbine torque. ($M_{ts}$) and the minimum turbine torque ($M_{tm}$), from a previous value of the binary control signal and from a sign of the desired turbine torque ($M_{ts}$);

wherein in said step of using a characteristic curve to determine a desired engine torque ($M_{ms}$) and a desired engine speed ($n_{ms}$), said at least.desired turbine torque ($M_{ts}$) comprises at least one of desired turbine torque ($M_{ts}$) and desired turbine speed ($n_{ts}$).

4. A device for controlling the longitudinal dynamics of a motor vehicle as a function of input data comprising current vehicle driving state parameters, and at least one of a desired longitudinal speed ($v_{sp}$) and a desired longitudinal acceleration ($a_{sp}$) comprising:

a first stage for determining controller-internal values for the desired longitudinal speed ($v_{si}$) and the desired longitudinal acceleration ($a_{si}$); and a second stage, connected downstream of the first stage, which uses the controller-internal values as input variables for an inverse vehicle longitudinal dynamics model to determine at least a drive train actuating signal ($U_a$) as an output signal of the inverse vehicle longitudinal dynamics model, which generates corresponding actuating signal values in response to an input of said desired longitudinal speed value and said desired longitudinal acceleration value, based on an inversion of a model which simulates dynamic response of the vehicle to input actuating signal values.

5. The device according to claim 4, for a motor vehicle with automatic transmission, wherein the second controller stage (3) comprises:

a first unit (16) for determining a desired wheel driving torque ($M_{Rs}$) and a desired wheel speed ($n_{Rs}$);

a second unit (17), connected downstream of the first unit, for determining a desired turbine torque ($M_{ts}$) and a desired turbine speed ($n_{ts}$);

a third unit (18), connected downstream of the second unit, for ascertaining drive/overrun changeover; and a fourth unit (19) connected downstream of the third unit for generating the drive train actuating signal ($U_a$).

6. The device according to claim 5, wherein the second controller state (3) further comprises:

a fifth unit (20), in parallel with said fourth unit (19), for generating a braking system actuating signal ($U_b$).

7. The device according to claim 4, wherein:

said second controller stage (3), also determines and emits a braking system actuating signal ($U_b$) as a function of input data.

8. The device according to one of claim 4, wherein said first stage (2) implements a speed control algorithm.

9. The device according to one of claim 4, wherein said first stage (2) implements and acceleration control algorithm.

* * * * *